Nov. 22, 1966   R. C. BRIDGES   3,286,987
HYDRAULIC CLAMPING AND TENSIONING MEANS FOR SAW BLADES
Filed Sept. 4, 1964   2 Sheets-Sheet 1

INVENTOR.
RAYMOND C. BRIDGES.
BY Fetherstonhaugh & Co
ATTORNEYS

Nov. 22, 1966  R. C. BRIDGES  3,286,987
HYDRAULIC CLAMPING AND TENSIONING MEANS FOR SAW BLADES
Filed Sept. 4, 1964  2 Sheets-Sheet 2

*INVENTOR.*
*RAYMOND C. BRIDGES*
BY~ *Fetherstonhaugh & Co.*
ATTORNEYS

United States Patent Office 3,286,987
Patented Nov. 22, 1966

3,286,987
HYDRAULIC CLAMPING AND TENSIONING MEANS FOR SAW BLADES
Raymond C. Bridges, 55 Rockview Gardens, Concord, Ontario, Canada
Filed Sept. 4, 1964, Ser. No. 394,494
3 Claims. (Cl. 254—51)

This invention relates to a hydraulic device.

In particular, this invention relates to a hydraulic clamping device for clamping saw blades. In the operation of large rock cutting saws, considerable difficulty is experienced in locating the saw blades in the desired operational position and applying the required tension to the saw blade. Various methods of locating and tensioning saw blades have been employed heretofore with only a limited degree of success.

It is well known to rigidly secure one end of a saw blade to a reciprocating blade housing and to secure the other end and apply tension to the saw blade by employing a tapered wedge driven between the blade grip and the reciprocating housing. This method although extremely simple has innumerable failings. The clamping of the blade is purely mechanical and the operator has no method of determining the tension applied to the blade other than by "ringing" the blade. Furthermore, the wedges must be adjusted to compensate for stretching of the blade from time to time during the operation of the saw. Where several blades are mounted on one blade housing at the same time differences in tension between the blades can greatly reduce the efficiency of the sawing operation.

Other methods of clamping and tensioning the blades have been developed which employ hydraulic cylinders having reciprocating pistons which apply a tensioning force to one end of the blade. These clamping devices generally comprise a hydraulic cylinder having an inner hydraulic fluid chamber and a plurality of reciprocating pistons actuated directly by the hydraulic fluid. Considerable difficulty has been experienced in preventing the leakage of hydraulic fluid from this type of clamp with the result that the cost of manufacturing these devices is extremely high.

It is an object of this invention to provide a hydraulic clamping device which is actuated by the expansion of a plastic hydraulic fluid container.

It is a further object of this invention to provide a clamping device for locating a plurality of saw blades and applying an equal and known tension to each and every blade.

It is a still further object of this invention to provide a hydraulic clamping device wherein a plurality of actuators are actuated by the expansion of a hydraulic fluid container.

It is a still further object of this invention to provide a clamping device of the type hereinbefore described which is relatively inexpensive to manufacture and which is free from hydraulic leaks.

With these and other objects in view, the invention generally employs a rigid housing adapted to house an expandable hydraulic fluid container and to permit expansion of the fluid container in a predetermined direction. A plurality of actuators are movable in the housing and are adapted to move in response to expansion of said fluid container between a first retracted position and a second extended position.

The rigid housing is adapted to be carried by one end of the reciprocating frame of a rock cutting gang saw and provides one actuator to clamp each saw blade mounted in the frame. Hydraulic fluid is supplied under pressure to the bore of the expandable hydraulic fluid container to cause the container to expand, thereby actuating the actuators to clamp the saw blade.

The invention will be clearly understood after reference to the following detailed specification read in conjunction with the drawings.

Figure 1:
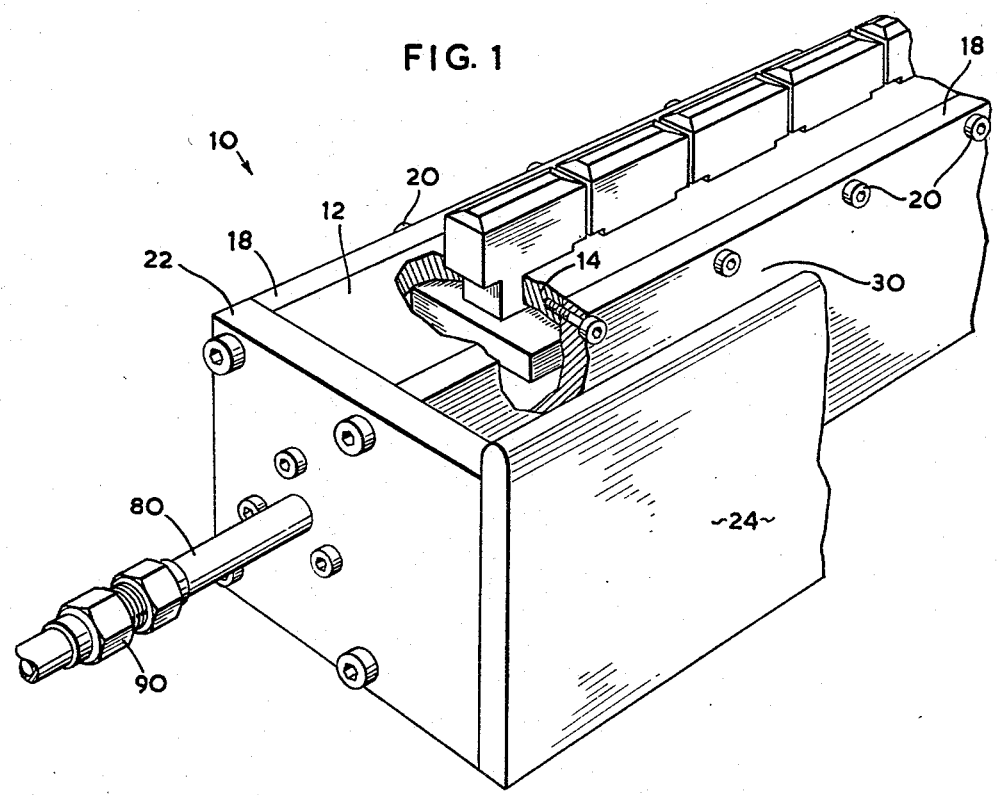
FIGURE 1 is a partially sectioned pictorial view of the clamping device of the present invention.

With reference to the drawings, the reference numeral 10 refers generally to a hydraulic device according to an embodiment of the present invention. A main housing 12 comprises longitudinally extending top plate 14, bottom plate 16 and side plates 18 rigidly secured together by means of cap screws 20. A rigid end plate 22 is secured to each end of the housing 12 to substantially close the housing. The end plates 22 extend outwardly from the housing and are rigidly secured to a brace plate 24 which extends longitudinally between said end plates 22 and lies in the same plane and is parallel to the side plates 18. The brace plate 24 together with the end plates 22 and one side plate 18 define a substantially rectangular passageway 30 which is adapted to receive the saw blade grip as will be described hereinafter. The main housing 12 and the brace plate 24 are made from high tensile steel or other suitable similar material which exhibits a high resistance to bending.

Figure 2:
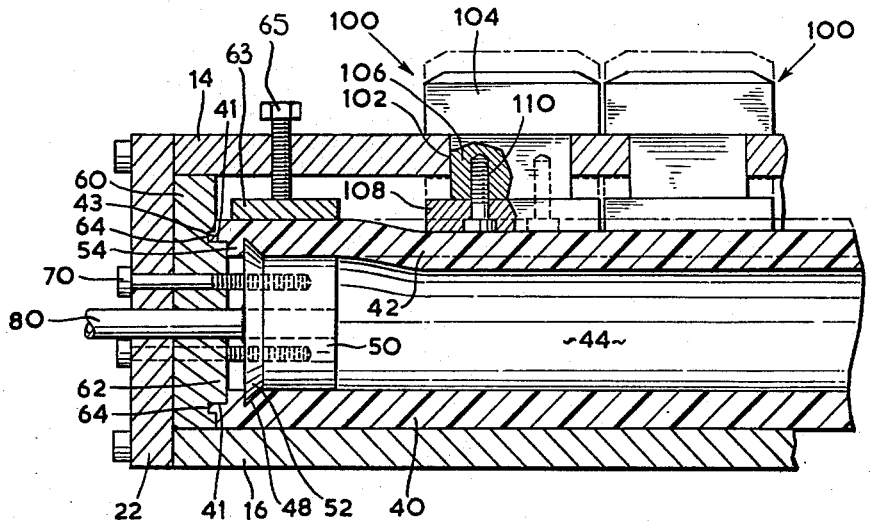
FIGURE 2 is a sectional view of the clamping device of FIGURE 1.

With reference to FIGURE 2, it can be seen that an expandable hydraulic fluid container 40 is adapted to fit within the housing 12. The expandable fluid container 40 is preferably of a substantially square exterior cross section as to fit within the housing 12 and to be restrained on three longitudinally extending surfaces by bottom wall 16 and side walls 18. The relationship between the internal dimensions of the housing and the external dimensions of the expandable hydraulic fluid container being such that a space 26 is provided between the upper wall 42 of the expandable container and the upper wall 14 of the housing 12.

The expandable hydraulic fluid container is formed from a tough, flexible plastic material such as polyurethane and has a substantially square external cross section and is provided with a substantially round bore 44 into which hydraulic fluid is suppled under pressure. One end of the container 40 is closed (not shown) in the manner of a blind hole and abuts the inner surface of an end plate 22 (not shown). The open end of the expandable hydraulic fluid container 40 is closed by means of a steel stopper 50. The stopper 50 is provided with an outwardly diverging end portion 52 which cooperates with a circumferentially extending groove 48 in the bore 44. Said circumferentially extending groove 48 is spaced inwardly of the open end of the bore 44 to form a shoulder 54 which acts as a sealing ring as will be described later. An interior end plate 60 preferably of steel is adapted to fit within the housing 12 and to abut the interior surface of the end plate 22 as shown in FIGURE 2. A cylindrically shaped projection 62 is formed on the inner surface of plate 60 and has a diameter substantially equal to the largest diameter of the diverging shoulder 52. A circumferentially extending under cut 64 is provided at the base of the projection 62 to further increase the sealing efficiency as will be described later.

A recess 41 is formed in the free end of the container 40 to receive the projection 62 in a close fitting relationship and a circumferentially extending shoulder 43 is formed on the free end of the container 40 to engage within the circumferentially extending groove 64.

Three cap screws 70 extend through the end plate 22 and the insert 60 and are threadably received by the stopper 50.

Sealing of the bore 44 of the container 40 is achieved by pulling the stopper 50 toward the insert 60 by means of the screws 70 to compress the shoulder 54 between the stopper 50 and the insert 60. It will be apparent that considerable force can be applied by means of the screws 70 to the stopper 50 to eliminate all chance of undesirable leakage of the hydraulic fluid.

Hydraulic fluid is introduced to the bore 44 by way of hydraulic fluid inlet pipe 80 which extends through the end plate 22, insert 60 and stopper 50. The pipe 80 being rigidly secured to the stopper 50 in a well known manner to provide a leak proof connection therebetween. The hydraulic fluid inlet pipe 80 is connected to any suitable source of hydraulic pressure such as a hydraulic pump by means of a conventional union as shown at 90 in FIGURE 1. A conventional pressure gauge (not shown) is employed in the hydraulic fluid circuit to indicate the pressure of hydraulic fluid in the expandable fluid container.

A plate 63 is located within the space 26 immediately above the steel stopper 50 and applies a force to the upper face of container 42 by means of jacking screws 65 to prevent bulging of the container in the region of the stopper 50 when fluid under pressure is applied to the container.

A plurality of reciprocating actuators 100 are slidably received in a close fitting sliding relationship within a plurality of openings 102 formed in top plate 14. The actuators 100 are formed with a body portion 106 which is adapted to fit in a close fitting sliding relationship within the opening 102 and a head portion 104 which is adapted to abut the under surface of top plate 14. A stop plate 108 is rigidly secured to the lower end of said body portion 102 by means of recessed screws 110 as shown in FIGURE 2. The lower surface of the stop plate 108 is adapted to rest on the upper surface of hydraulic fluid container 42. The body portion 102 is of a length to permit the actuator 100 to reciprocate between a first retracted position and a second extended position as shown in FIGURE 2. Any reasonable number of reciprocating actuators may be employed and one actuator is employed to clamp each saw blade as will be described hereinafter. By providing a plurality of actuators and employing one actuator to clamp each of a plurality of blades and equal tensioning force is applied to each blade regardless of the stretching of the blade which occurs during a sawing operation.

Figure 3:
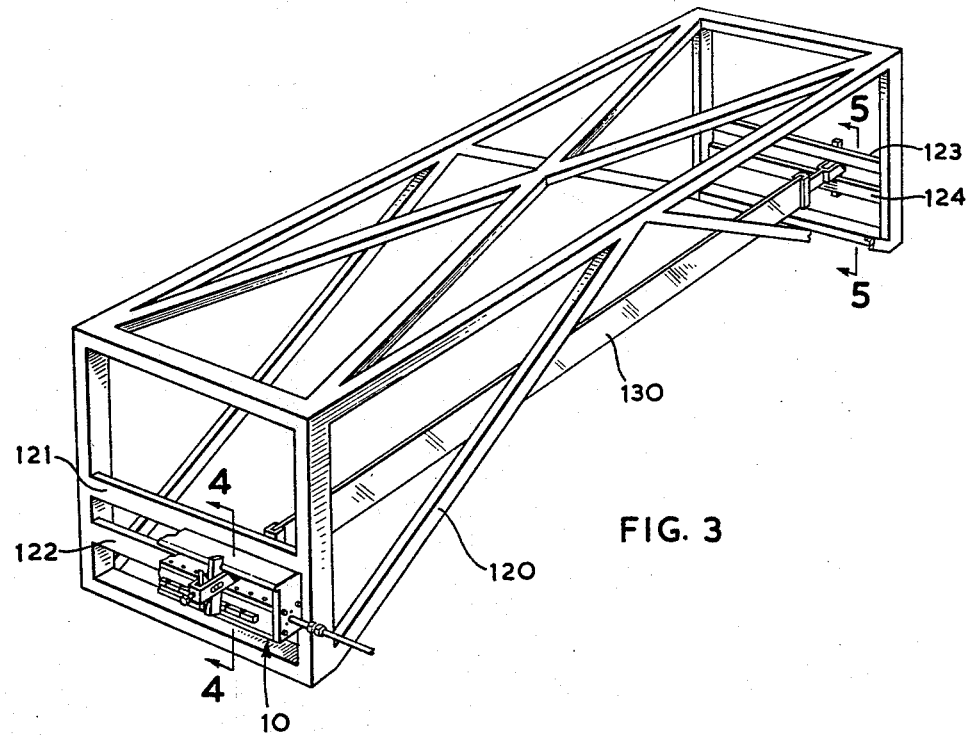
FIGURE 3 is a pictorial view of a typical reciprocating gang saw frame.

In use, the hydraulic device 10 is employed in conjunction with a reciprocating gang saw frame 120 as shown in FIGURE 3. It is well known to employ a reciprocating frame such as that shown in FIGURE 3 in a rock cutting gang saw. The frame 120 is provided with transversely extending support struts 121 and 122 at one end thereof and co-operating struts 123 and 124 at the other end thereof between any reasonable number of saw blades 125 may be extended in a well known manner.

Figure 4:
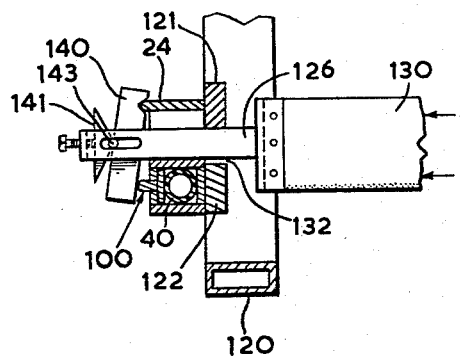
FIGURE 4 is a sectional view along the line 4—4 of FIGURE 3.
Figure 5:
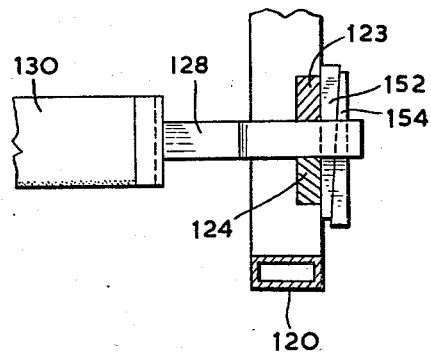
FIGURE 5 is a sectional view along the line 5—5 of FIGURE 3.

With reference to FIGURE 4, it can b seen that a saw blade 130 is carried by and extends between opposed support struts 121, 122 and 123, and 124. Grips 126 and 128 are employed to support the saw blade. The hydraulic device 10 is rigidly secured to the transversely extending support struts 121 and 122 such that the passage 30 formed in the clamping device 10 is aligned with the passage 132 formed between the co-extending support struts 121 and 122. The grip 126 extends through the opening 132 and the opening 30, and is provided with a pivotably mounted rocker arm 140, and rocker plate 141. The rocker arm 140 is of a length to bridge the gap between the actuators 100 and the support bracket 24. A pivot pin 143 lies partially in the rocker arm 140 and rocker plate 141 to permit the rocker arm 140 to pivot relative to the grip 126. An adjustment screw 150 is provided to pretension the blade and the pivot pin 143 is slidable in slot 145. The grip 126 is located substantially equidistant the struts 121 and 122 such that the distance between the actuator 100 and the support strut 24 is substantially twice the distance between the pivot pin 141 and the support strut 24 whereby a mechanical advantage of approximately 2:1 is achieved in the application of tension to the blade 130 by the actuators 100. The other end of the saw blade is rigidly held by grip 128 which is in turn rigidly secured to the co-extending struts 123 and 124 by means of co-operating wedges 152 and 154 in a well known manner.

In operation the saw blade and co-operating grips 126 and 128 are loosely mounted within the frame 120 and the clamping screw 150 and co-operating rocker plate 141 and rocker arm 140 are adjusted to apply light tension to the saw blade by depressing the actuators 100 within the hydraulic device 10. Hydraulic fluid is supplied under pressure to the bore 44 of the container 40. As the pressure within the container 40 builds up the container expands thereby pushing the actuators 100 outwardly to apply a force to the rocker arm 140. The rocker arm 140 pivots about the brace plate 24 and applies a tensile force to the blade 130 by way of the grip 126. The force applied to the saw blade 130 being approximately twice that exerted by the actuator 100 due to the mechanical advantage derived from the use of the rocker arm 140.

In use it has been found that the hydraulic fluid pressure of 2,000 p.s.i. can easily be applied to the container without damage to the container or leakage of hydraulic fluid. The force applied in the clamping of a saw blade is generally in the region of 12,000 lbs. when cutting limestone and 20,000 lbs. when cutting marble, and this force can be obtained by applying a pressure of approximately 1,000 p.s.i.–1,666 p.s.i. to a container having a bore diameter measuring approximately 1⅝″ when an actuator having a base portion of cross section measuring approximately 2″ x 3″ is employed. It will be appreciated that the pressure required within the container can be reduced by increasing the mechanical advantage obtained by varying the dimensions of the rocker arm.

It will be apparent that modifications of the present invention are well within the scope of an individual skilled in the art.

It will be apparent that the brace plate 24 may be separate from the main housing 12 as the brace plate is only required to provide an elevated platform to support the blade grips.

It will also be apparent that the clamp according to the present invention may be employed in applications other than that illustrated herein without departing from the scope of the invention.

The embodiments of the invention in which an exclusive property or privilege is claimed are defined as follows:

1. In a hydraulic clamping and tensioning device for saw blades comprising a substantially tubular housing, a flexible fluid container in said housing, passage means formed in said housing, a plurality of rigid actuators movably carried by said housing and extending through said passage means, said actuators being free to move relative to one another, a plurality of pressure plate means in said housing, each of said pressure plate means being connected to one of said actuators and movable therewith, said pressure plates having a lower surface exposed to said flexible container, said actuators being movable relative to said housing between an inner set position and an outer extended position, rigid stop means for limiting the outward movement of said actuators relative to said housing, stop means for limiting inward movement of said actuators relative to said housing when said actuators are in said inner set position, said actuators having head portions extending outwardly from said housing to provide a plurality of fulcrum edges which co-operate with rocker arms carried by said saw blades to effect the initial clamping of the blades when said actuators are in said inner set position, means for admitting and relieving fluid to and from said container, said actuators being adapted to follow the movement of said flexible container as it is expanded within said housing.

2. In a hydraulic clamping and tensioning device for saw blades comprising a substantially tubular housing, a flexible fluid container in said housing, said housing being adapted to embrace a major portion of the exterior surface of said flexible fluid container to prevent expansion of the embraced major portion in response to fluid pressure in the container, a minor portion of the exterior surface of said flexible fluid container being spaced from the interior adjacent portion of said tubular housing to define an expansion chamber therebetween, passage means formed in said housing and extending into said expansion chamber, a plurality of rigid actuators movably carried by said housing and extending through said passage means into said expansion chamber, said actuators being free to move relative to one another, a plurality of pressure plate means in said expansion chamber, each of said pressure plate means being connected to one of said actuators and movable therewith, said pressure plates having a lower surface exposed to said minor portion of the exterior surface of said flexible container, the total area of said lower surfaces of said pressure plates being substantially equal to the total area of said minor portion of the exterior surface of said flexible container, said actuators being movable relative to said housing between an inner set position and an outer extended position, rigid stop means for limiting the outward movement of each of said actuators relative to said housing, stop means for limiting inward movement of said actuators relative to said housing when said actuators are in said inner set position, said actuators having head portions extending outwardly from said housing to provide a plurality of fulcrum edges which co-operate with rocker arms carried by said saw blades to effect the initial clamping of the blades when said actuators are in said inner set position, means for admitting and relieving fluid to and from said container, said actuators being adapted to follow the movement of said minor portion of said container as it is expanded within said housing.

3. In a hydraulic clamping and tensioning device for saw blades, a housing, at least one actuator movable in said housing, an expandable fluid container in said housing, said container having a flexible body, a bore formed in said body, at least one end of said bore being an open end, closure means adapted to close said open end, said closure means comprising, a stopper adapted to fit within said bore, said stopper being formed with an end of greater diameter than said bore, said bore being formed with a groove to receive said end of said stopper, said groove being formed inwardly of the free end of said bore to form a shoulder, means co-operating with said stopper to compress said shoulder to seal said open end of said bore to prevent leakage of said fluid, means for admitting and relieving fluid to and from said bore to cause expansion of said container, said actuator being adapted to follow the movement of said container as it expands within said housing.

References Cited by the Examiner
UNITED STATES PATENTS

| 1,297,809 | 3/1919 | Dixon et al. | 242—72 |
| 1,752,101 | 3/1930 | Meutsch. | |
| 2,113,909 | 4/1938 | Wasserkampf | 143—156 |
| 3,048,345 | 8/1962 | Willard | 242—72 |
| 3,053,467 | 9/1962 | Gidge | 242—72 |

FOREIGN PATENTS

| 26,183 | 2/1953 | Finland. |

WILLIAM FELDMAN, *Primary Examiner.*
OTHELL M. SIMPSON, *Examiner.*